Aug. 23, 1955    M. M. MAIN    2,716,034
PACKING MATERIAL
Filed June 2, 1952
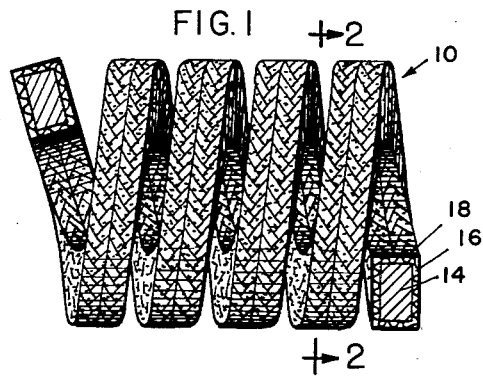
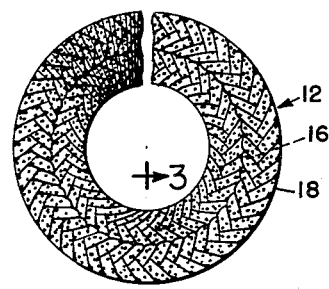
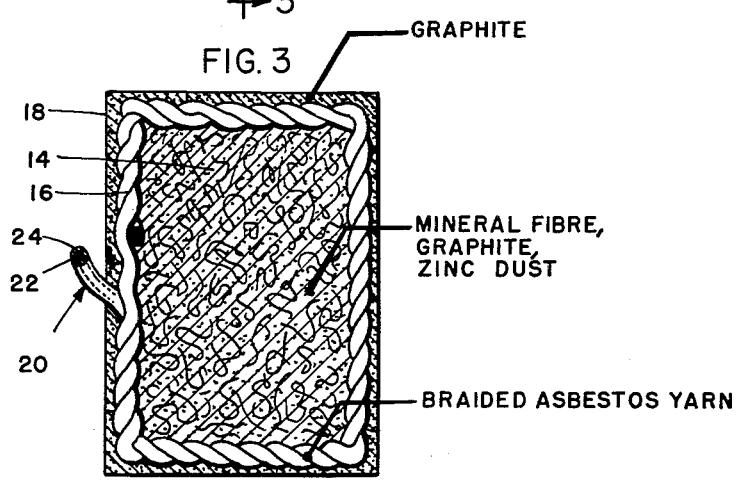
INVENTOR:
MERRILL M. MAIN
BY
Edward R. Lowndes

United States Patent Office 2,716,034
Patented Aug. 23, 1955

2,716,034

PACKING MATERIAL

Merrill M. Main, Park Ridge, Ill., assignor to Crane Packing Company, Chicago, Ill., a corporation of Illinois Application June 2, 1952, Serial No. 291,237

2 Claims. (Cl. 288—8)

The improved packing material comprising the present invention is primarily adapted for use in high graphite content packing glands associated with reciprocating or rotary stainless steel shafting as for example the valve stem shafting of high temperature, high pressure steam engines and similar steam equipment. The invention is, however, capable of other uses and the improved packing material may, if desired, with or without modification, be employed in all manner of packing glands for movable stainless steel shafting regardless of the temperatures and pressures involved.

Almost since the advent of stainless steel for use in the manufacture of valve stems and similar shafting difficulty has been encountered due to pitting and other forms of corrosion of the stems when installed in packing glands containing, among other things, flaked graphite commonly employed as a dry lubricant in the packing material of such glands. Particularly has such corrosion of the valve stems been augmented when the packing glands are subjected to moisture as is the case when the valves are put to actual use. After a period of use, when the particular machine involved is allowed to stand idle, as for example overnight or during week ends, the stainless steel shafting which is surrounded by the wet graphite-containing packing is subject to corrosion and consequent pitting thereof. Similarly, where according to the usual practice of manufacturers to test the shafting with water prior to storage thereof, the same conditions obtain and corrosion of the shafting takes place on the shelf before the shafting is placed in service.

While the present invention is predicated upon the theory that the pitting of stainless steel shafting, when assembled in a packing gland containing graphite and when the gland is subjected to the presence of moisture, is due to certain electro-chemical relations that will be pointed out presently, the invention is not limited to this theory or to any other explanation that may be advanced in support of the same. Furthermore, the correctness or incorrectness of the theory herein advanced in support of the invention shall in no manner limit the scope of the invention or of the appended claims.

Magnesium, zinc, aluminum and cadmium are the four leading metals (in the order named) at the high end of the galvanic scale of elements. Stainless steel, as an alloy, is relatively high on the galvanic scale of metals and falls slightly below the group of metals mentioned above. Graphite (carbon) on the other hand is extremely low in the galvanic series of elements and thus, when graphite constitutes one ingredient of a packing gland for stainless steel shafting, a galvanic couple is set up when the packing gland is exposed to moisture and there is a tendency for the surface of the shafting to dissolve in the surrounding electrolyte of the galvanic couple. This dissolving of the surface of the shafting is not uniform or constant but is sporadic and spotted, thus having an effect on the shafting which is far more deleterious and which produces rapid pitting of the shafting with the result that it is soon rendered unfit for service.

The incorporation of a sacrificial metal high on the galvanic scale with the packing material of the packing gland will prevent such pitting of the stainless steel shafting due possibly to a reversion of the polarity of the couple. With the moisture of the packing gland constituting the electrolyte, the sacrificial metal which is higher on the galvanic scale will dissolve in the presence of the graphite and the stainless steel material of the shafting will remain protected against such corrosion until such time as the sacrificial metal has been exhausted.

It has been found that if the sacrificial metal, usually in the form of zinc dust, is equally distributed through the packing material, or if it is concentrated excessively at or near the surface of the material, there is a tendency for the zinc material to adhere to the surface of the shafting. In the case of stainless steel valve stems this mechanical deposition of the zinc material upon the valve spindles may even occur to such a degree as to interfere with the freedom of rotary and reciprocal movement of the valve spindles in the packing gland.

The present invention is designed to overcome the above noted limitations that are sometimes attendant upon the use of zinc-bearing packing material in packing glands for stainless steel shafting and toward this end it contemplates the provision of a novel type of fabricated packing material containing a sacrificial metal such as zinc but in which the stainless steel shafting is protected from physical contact with the sacrificial metal.

The provision of an anti-corrosion packing material for stainless steel shafting of the character briefly outlined above being among the principal objects of the invention, a further object is to provide a novel form of packing material having associated therewith a reservoir for the sacrificial metal which is of relatively large capacity and in which an ample supply of the sacrificial metal is contained and which further serves to maintain the sacrificial metal out of direct contact with the stainless steel shafting, yet which at the same time allows the same to function as one element of a galvanic couple to afford protection to the stainless steel shafting when the latter is operatively installed in a packing gland.

A still further object of the invention is to provide a packing material of this nature which is in the form of a prefabricated packing element shaped to accommodate the requirements of a particular packing gland and which is comprised of an outer porous jacket enclosing an inner core which contains the graphite material and in which the graphite material serves the dual purpose of affording lubrication for the fibrous material of the core as well as lending a degree of compressibility to the packing material as a whole so that the same may be initially shaped to the desired form and thereafter, when installed in a packing gland, be caused to flow to accommodate exactness in gland dimensions.

The provision of a packing material which readily lends itself to ease of manufacture and which therefore may be constructed at a relatively low cost; one which is rugged and durable and which therefore is possessed of a long life when installed in a packing gland; one which is efficient in its operation, both as regards its sealing qualities as well as in its protection of stainless shafting from corrosion, and one which otherwise is well adapted to perform the services required of it are further desirable features that have been borne in mind in the production and development of the present invention.

In the accompanying single sheet of drawings forming a part of this specification, a preferred embodiment of the invention has been shown. In these drawings:

Fig. 1 is a fragmentary side elevation view of a length of packing wound into helical form for convenience of shipping.

Fig. 2 is a sectional view taken substantially along the line 2—2 of Fig. 1.

Fig. 3 is of an enlarged cross section of the packing material of Fig. 1.

In all of the above described views, similar characters of reference are employed to designate similar parts throughout.

Referring now to the drawings in detail, in Fig. 1 a length of finished packing is designated in its entirety at 10 and is shown as being wound into helical form for convenience of shipping. The length 10 is shown as being square in cross section to accommodate the requirements of a particular packing gland but it will be understood that the packing material may be constructed of any desired cross-sectional shape and of any desired size.

The length 10 of Fig. 1 may conveniently be cut lengthwise along the helix at one side thereof with the cut extending completely through adjacent turns at right angles to the turns so as to produce a number of individual packing units or gland seals such as the single unit shown at 12 in Fig. 2. After cutting in this manner, the opposed adjacent ends of each unit may be brought into alignment to provide a circular ring-like packing unit suitable for insertion or installation in a packing gland. Such a practice of cutting helically wound packing material is known and no claim is made herein to any novelty associated therewith.

The packing material of the length 10, and consequently of the individual units 12, is comprised of a central core 14 (Fig. 3) or "formula" as it is sometimes termed, consisting of a mixture of a mineral fiber, graphite and metallic dust and the nature and function of which will be set forth presently. Surrounding the core 14 and confining the same therein under a certain amount of compression is an outer jacket 16 which is of a braided nature and which may be comprised of wire reinforced asbestos yarn the nature of which will also be made clear presently.

The outer jacket 16 made be provided with an outside coating 18 of graphite which is suitably bonded to the outside surfaces of the individual strands which cooperate to make up the braided jacket, all in a manner that will become clear when the description of the mode of manufacture of the improved packing material is set forth.

Referring now to Fig. 3, the material of the core 14 as previously stated is comprised essentially of a mineral fiber, a quantity of graphite and a metallic dust. The particular metallic dust employed consists of a metal or a mixture of metals high on the galvanic scale of metals such as magnesium, zinc, aluminum or cadmium, all of which are higher in the scale than are the chromium-content ferrous alloys known as stainless steel.

In actual practice it is preferred that the metallic dust employed be powdered zinc since this metal is sufficiently high in the galvanic scale to afford protection to the stainless steel shafting with which the packing material is ultimately to be associated, while at the same time it possesses none of the limitations that are attendant upon the use of the other metals mentioned. In other words metallic zinc in finely divided form is not a fire or explosion hazard as is magnesium. Unlike cadmium it offers proven protection to stainless steel in a galvanic couple and it is not as costly. Finally, it is required in far less quantities by volume than is aluminum and it is considerably more electropositive with respect to the stainless steel shafting.

The core material 14 also contains a filler which is preferably a mineral fiber such as asbestos and an elastomeric binder may be employed during the mixing process. Additionally a suitable lubricant such as oil, wax or a mixture thereof may constitute an ingredient of the core 14.

While the specific ingredients of the core material or formula may vary somewhat, it has been found that a material of the following analysis is highly effective in the packing material assembly to perform the functions required of it:

|   | Percent by weight |
|---|---|
| Asbestos fiber | 40 |
| Flake graphite | 39½ |
| Elastomeric binder | 1½ |
| Lubricant | ½ |
| Zinc dust | 18½ |

The above percentages are by weight.

The flake graphite material may consist of 87½% commercial large flake material and 12½% fine material.

In the assembled packing and in actual use, the graphite core material serves in the manner of a dry lubricant for the mineral fiber as well as a carrier therefor to maintain the individual strands thereof properly distributed throughout the mass. The graphite material further lends "fluidity" to the packing material as a whole to permit the install unit 12 to "flow" to the specific shape of the interior of the packing gland in which it is installed.

The zinc dust material is evenly distributed throughout the mass of the core 14 and the interior of the wire reinforced braided asbestos yarn jacket 16 constitutes in effect a reservoir for the zinc material in its graphitic suspension. In this manner the zinc remains isolated from the surface of the stainless steel shafting with which the packing material is associated while at the same time a dry cell battery effect takes place when the packing gland is subjected to moisture with the zinc gradually becoming consumed as the electrolytic action takes place. Such consumption of the zinc not only serves to protect the surface of the stainless steel shafting against corrosion but it also protects the surface of the shafting from mechanical deposition thereon of metallic particles of the zinc. While a very small amount of the comminuted zinc dust may in time work its way outwardly through the enclosing braided asbestos yarn jacket 16. This material will be electrolytically dissipated before it has an opportunity to contact the shafting. This is because in any galvanic couple the rate of consumption of the electropositive particles of the couple in an electrolyte is a function of some power of the distance between the electronegative and the electropositive particles. By virtue of this phenomenon, the outermost zinc particles of the core 14 at or near the jacket 16 will be consumed in the process of moving toward the surface regions of the packing material.

The braided wire reinforced asbestos yarn jacket 16 is comprised of a number of individual strands 20 each including a central wire core 22 which may be of brass, Monel metal, Inconel, stainless steel or the like, surrounded by mineral asbestos fibers 24 in sufficient bulk to afford mechanical protection to the stainless steel shafting against surface contact with the core 20.

In assembling the length 10 of packing material somewhat conventional processes are involved. The ingredients of the core formula are introduced into a spike mixer and are agitated until homogeneous. The lubricant and elastomeric binder are preferably diluted in an elastomer such as ordinary cleaner's naphtha prior to introduction into the mixer. After thorough mixing, the formula is placed in an hydraulic extruder and during extrusion thereof through the extruder nozzle, the wire-reinforced asbestos yarn is mechanically braided upon the issuing jet which constitutes the core 14 of the packing assembly.

During the braiding operation the wire core 22 constitutes a tension member and in the finished product it reinforces the same so that it may be bent to a curvature of small radius without injury.

After the partially completed packing has assumed a cylindrical form from the braiding operation it is run through a solution of an elastomer and is thus wetted prior to being passed through a dip of the graphite coating 18. Thereafter the cylindrical dipped and coated packing material may be dried in a hot air oven and subsequently passed through suitable forming dies or rollers by means of which it is brought to the rectangular cross-sectional shape and form illustrated in Fig. 1 or to any other desired cross-sectional shape.

In a modified form of the packing material, the outer coating 18 may contain an amount of the zinc dust material or other metallic dust high in the galvanic scale of metals. When such is the case, the zinc material will be added to and mixed with the graphite material of the coating prior to the dipping operation. In this manner the amount of zinc material employed may be carefully regulated. When the coating 18 contains a sacrificial metal such as zinc, the percentage of zinc to graphite is not large or otherwise undesired coating of the stainless steel shafting might take place. With small percentages of zinc dust contained in the coating 18, say approximately 5%, a high initial degree of galvanic protection to the stainless steel shafting is afforded due to the close proximity of the two active metals of the galvanic couple.

The invention is not to be limited to the exact construction of the packing material described herein nor to the exact ingredients for the constituent parts thereof as various changes in the details of construction and in the proportions of the ingredients may be resorted to without departing from the spirit of the invention. For example, while the formula for the plastic core 14 of the packing material has been set forth as being predicated upon the use of zinc as the sacrificial metal of the packing material, where other sacrificial metals are employed these proportions will be varied to a considerable extent. Similarly it is not necessary that a single sacrificial metal be used either for the core material 14 or for the coating 18 in the modified form of the invention. If desired one type of sacrificial metal may be used in the core and a different metal used in the coating. Or a mixture of different metals may be used for either the core or the coating or for both. Only insofar as the invention has particularly been pointed out in the accompanying claims is the same to be limited.

What is claimed is:

1. A self-contained anticorrosion packing material comprising an outer jacket of wire core asbestos fiber finely and tightly woven to provide an inner enclosure, a compact moldable homogeneous mixture of flake graphite, mineral fiber and finely divided zinc disposed within said inner enclosure and filling the same, the strands of said woven outer jacket being close fitting to prevent egress of the homogeneous mixture outwardly through the jacket, and an outer coating consisting of graphite and finely divided zinc intimately mixed together and secured to said jacket by adhesion.

2. A self-contained anticorrosion packing material comprising an outer jacket of wire core asbestos fiber finely and tightly woven to provide an inner enclosure, a compact moldable homogeneous mixture of flake graphite, mineral fiber and finely divided zinc disposed within said inner enclosure and filling the same, the strands of said woven outer jacket being close fitting to prevent egress of the homogeneous mixture outwardly through the jacket, and an outer coating containing graphite secured to said jacket by adhesion.

References Cited in the file of this patent

UNITED STATES PATENTS

| Number | Name | Date |
|---|---|---|
| 145,496 | Fisher | Dec. 16, 1873 |
| 380,515 | Pennington | Apr. 3, 1888 |
| 1,998,892 | Braden | Apr. 23, 1935 |
| 2,134,324 | Brackett | Oct. 25, 1938 |

FOREIGN PATENTS

| 25,853 | Great Britain | Nov. 7, 1910 |